United States Patent [19]
Abe et al.

[11] Patent Number: 5,855,334
[45] Date of Patent: Jan. 5, 1999

[54] RECTANGULAR PARALLELEPIPEDIC CASE AND METHOD OF PRODUCING THE SAME

[75] Inventors: Hirofumi Abe; Akihisa Inoue, both of Kanagawa; Shinichi Takahashi, Tokyo, all of Japan

[73] Assignee: Fuji Photo Film Co., Ltd., Kanagawa, Japan

[21] Appl. No.: 874,340

[22] Filed: Jun. 13, 1997

[30] Foreign Application Priority Data

Jun. 14, 1996 [JP] Japan ..................................... 8-154381
Jun. 14, 1996 [JP] Japan ..................................... 8-154382

[51] Int. Cl.$^6$ .................................................. B65D 85/671
[52] U.S. Cl. .................. 242/348; 242/348.4; 242/588.5; 229/930
[58] Field of Search .............................. 242/348, 348.3, 242/348.4, 588.4, 588.5; 229/104, 116.1, 930; 264/177.12

[56] References Cited

U.S. PATENT DOCUMENTS

| | | | |
|---|---|---|---|
| 4,068,247 | 1/1978 | Bouwen et al. | 242/348.4 |
| 4,239,164 | 12/1980 | Barnsbee et al. | 242/348.4 |
| 4,291,802 | 9/1981 | Buelens | 242/348.4 |
| 4,431,139 | 2/1984 | Barnsbee et al. | 242/588.4 |
| 4,787,513 | 11/1988 | Auble et al. | 242/348.4 |
| 4,928,827 | 5/1990 | Hara | 242/348.4 |
| 4,988,054 | 1/1991 | Morse et al. | 242/348.4 |
| 5,232,176 | 8/1993 | Zander et al. | |
| 5,322,213 | 6/1994 | Carter et al. | 229/166 |
| 5,354,009 | 10/1994 | Buelens et al. | 242/348.4 |
| 5,377,903 | 1/1995 | Gordon et al. | 229/116.1 |
| 5,501,758 | 3/1996 | Nitardy | 229/930 |

FOREIGN PATENT DOCUMENTS

| | | |
|---|---|---|
| 0 561 438 A1 | 2/1993 | European Pat. Off. . |
| 48-860 | 1/1973 | Japan . |
| 49-44073 | 12/1974 | Japan . |
| 5-254535 | 10/1993 | Japan .................................. 229/930 |

*Primary Examiner*—John P. Darling
*Attorney, Agent, or Firm*—Sughrue, Mion, Zinn, Macpeak & Seas, PLLC

[57] ABSTRACT

A rectangular parallelepipedic case includes four or more walls formed by bending a single plate. To produce the case, a double plate is used. The double plate is formed from plastic by extrusion, and first and second plate elements confronted with each other. Partition portions interconnect the first and second plate elements, and extend in the direction of the extrusion, to define plural hollow chambers between the first and second plate elements. The double plate is bent along bend lines substantially at a right angle. At least one of the bend lines is at least partially curved.

23 Claims, 12 Drawing Sheets

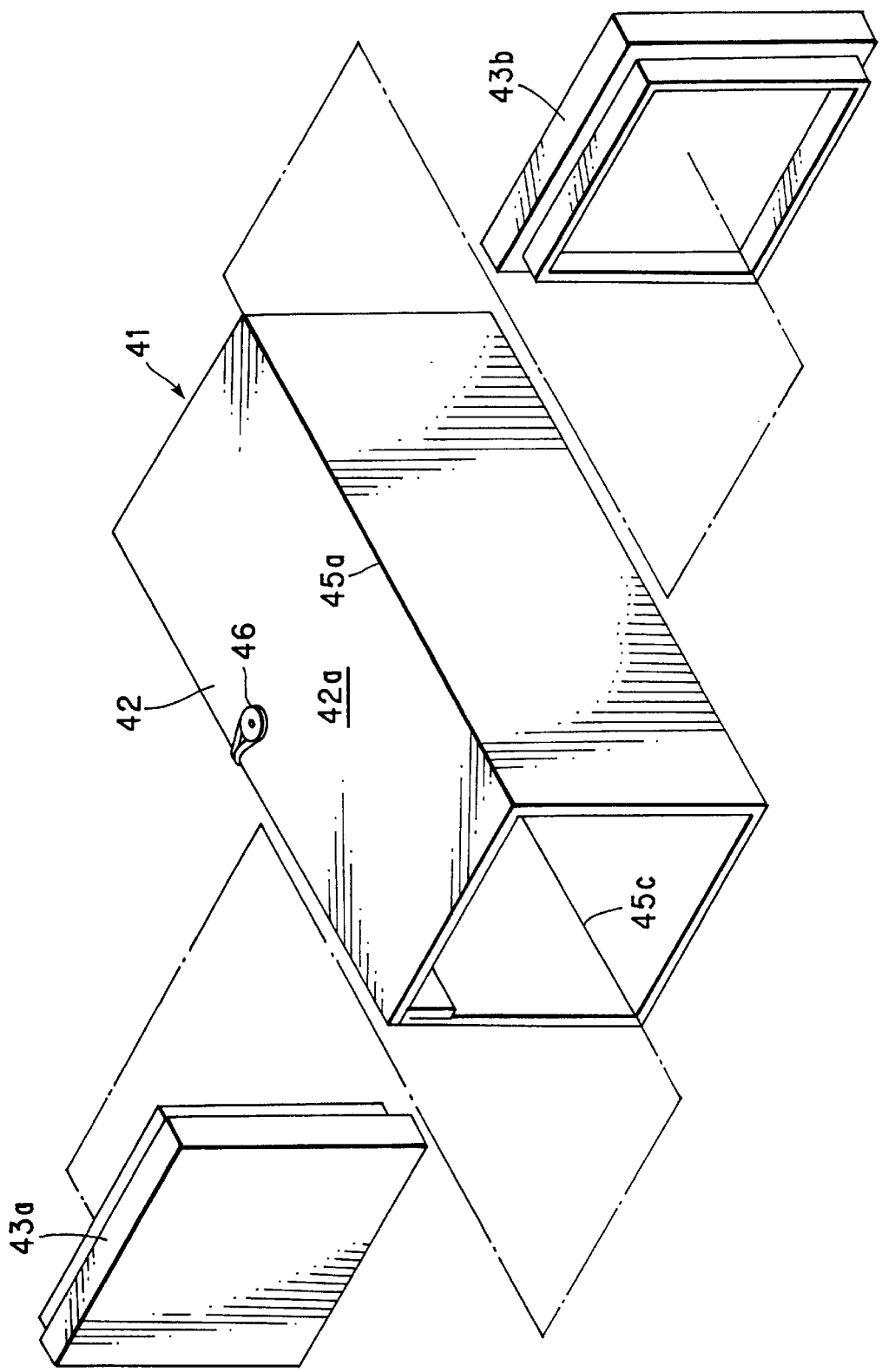

F I G. 12
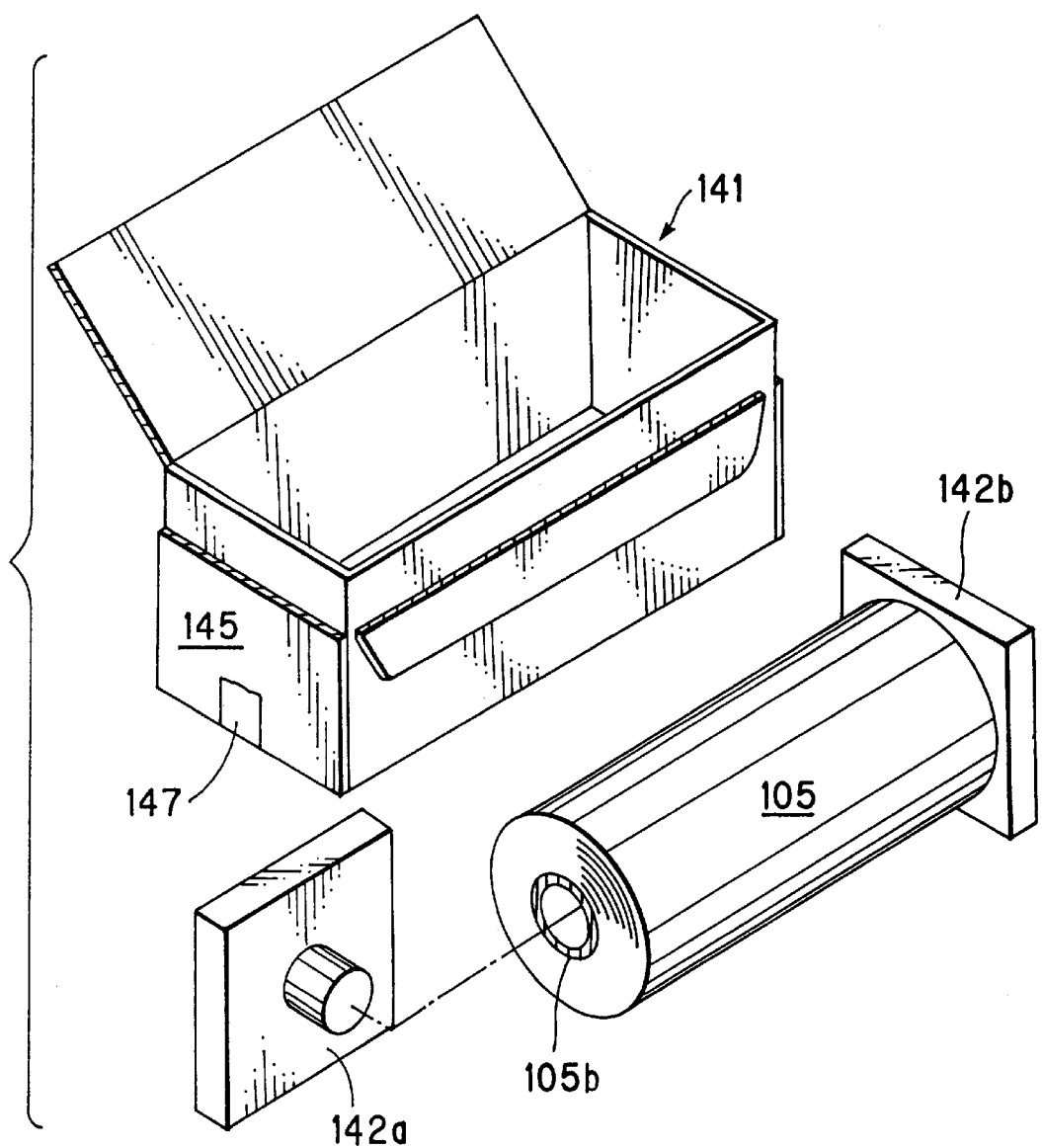

RECTANGULAR PARALLELEPIPEDIC CASE AND METHOD OF PRODUCING THE SAME

BACKGROUND OF THE INVENTION

1. Field of the Invention

The present invention relates to a rectangular parallelepipedic case and a method of producing the same. More particularly, the present invention relates to a rectangular parallelepipedic case or quadrangular prismatic case, in which unwanted deformation is easily avoided, and which has high rigidity and durability, and a method of producing the same.

2. Description Related to the Prior Art

JP-Y (Japanese Utility Model Publication No.) 49-44073 discloses a method of producing a rectangular parallelepipedic case or quadrangular prismatic case by bending a plate of thermoplastic synthetic resin. JP-B (Japanese Patent Publication No.) 48-860 discloses a method of producing a hollow plastic plate. Synthetic resin is formed by a technique of extrusion into the hollow plastic plate in which there are partition portions that are extended in a single direction of the extrusion, and inside the hollow plastic plate, a great number of long and thin hollow chambers are defined between adjacent two of the partition portions.

The hollow plastic plate is advantageous over a plate without the hollow chambers, because of its light weight, economy of material for production, and also high rigidity. The hollow plastic plate is widely used for boxes manufactured in mass production, and for containers containing articles with heavy weight. To produce the rectangular parallelepipedic case from a hollow plastic plate, plural bend lines are drawn on the hollow plastic plate at first, and then the plate is bent along the bend lines to build the rectangular parallelepipedic case.

If the rectangular parallelepipedic case or quadrangular prismatic case has a large size, there occurs a problem of deformation despite such an advantageous use of a hollow plastic plate. When lateral walls rising from a bottom wall have a great width, it is likely that centers of the lateral walls protrude outwards and are deformed in an expanded form. A top lid may be associated with the rectangular parallelepipedic case of which a top is open. But the deformation is likely to cause failure in fitting the top lid on the open top of the rectangular parallelepipedic case, because edges of the open top are likely to expand. Furthermore this deformation is visually not agreeable.

To avoid deformation of the case, it is known to secure a reinforcing frame or auxiliary plate on the outside or inside of the lateral walls. However this inevitably increases the total weight of the rectangular parallelepipedic case or quadrangular prismatic case. Problems occur in high cost and relatively small inner volume.

A photographic paper magazine is used for containing photographic paper. The photographic paper magazine has a quadrangular prismatic shape, and contains a core in a rotatable manner. Photographic paper is wound about the core in a roll form. EP-A 0 561 438 (corresponding to JP-A (Japanese Patent Laid-open Publication No.) 6-130569) discloses a photographic paper magazine formed from plastic by a method of extrusion. U.S. Pat. No. 5,232,175 discloses a photographic paper magazine formed from plastic by injection molding.

The plastic magazine is favorable, as it has a high durability. However there is no known plastic magazine more advantageous than a photographic paper magazine produced from cardboards, in view of its weight, portability, and ease of production.

SUMMARY OF THE INVENTION

In view of the foregoing problems, an object of the present invention is to provide a case of a quadrangular prismatic shape and recording material magazine of which unwanted deformation is easily avoided, and which has high rigidity and durability.

Another object of the present invention is to provide a case of a quadrangular prismatic shape and recording material magazine having a low weight and high portability, and capable of being produced easily.

In order to achieve the above and other objects and advantages of this invention, a case producing method produces a substantially rectangular parallelepipedic case, which has plural walls formed by bending a single plate. In the case producing method, a double plate is used, the double plate is formed from plastic by extrusion, the double plate including first and second plate elements confronted with each other, and partition portions for interconnecting the first and second plate elements, the plural partition portions extending in an extruding direction of the extrusion, to define plural hollow chambers between the first and second plate elements. The double plate is bent along plural bend lines substantially at a right angle, at least one of the bend lines being curved at least partially.

Furthermore, the at least one curved bend line causes at least one of the walls to curve inwards with respect to the case. The at least one curved bend line is located between two adjacent ones of the partition portions. The extruding direction of the double plate is a longitudinal direction along the length of the case. The bend lines are formed by a heat presser, the heat presser has a triangularly tapered shape tapered at an angle from 70° to 150°. The plastic is polypropylene.

In the substantially rectangular parallelepipedic case, the at least one curved bend line causes at least one of the walls to curve inwards with respect to the case.

In a preferred embodiment, the substantially rectangular parallelepipedic case contains a recording material roll, the recording material roll including a core and recording material wound about the core. A slit-shaped outlet is defined between the first and fourth walls, the recording material being drawn through the slit-shaped outlet. First and second caps are secured to respective ends of the quadrangular tubular shape, for supporting the recording material roll in a rotatable manner.

In accordance with the present invention, unwanted deformation is easily avoided. A case of a quadrangular prismatic shape and recording material magazine have high rigidity and durability.

A quadrangular prismatic shape and recording material magazine according to the present invention have a low weight and high portability, and are produced easily.

BRIEF DESCRIPTION OF THE DRAWINGS

The above objects and advantages of the present invention will become more apparent from the following detailed description when read in connection with the accompanying drawings, in which:

FIG. 5 is an exploded perspective illustrating another preferred rectangular parallelepipedic case;

FIG. 12 is an explanatory view illustrating the cardboard box with the paper roll.

DETAILED DESCRIPTION OF THE PREFERRED EMBODIMENTS OF THE PRESENT INVENTION

Figure 1:
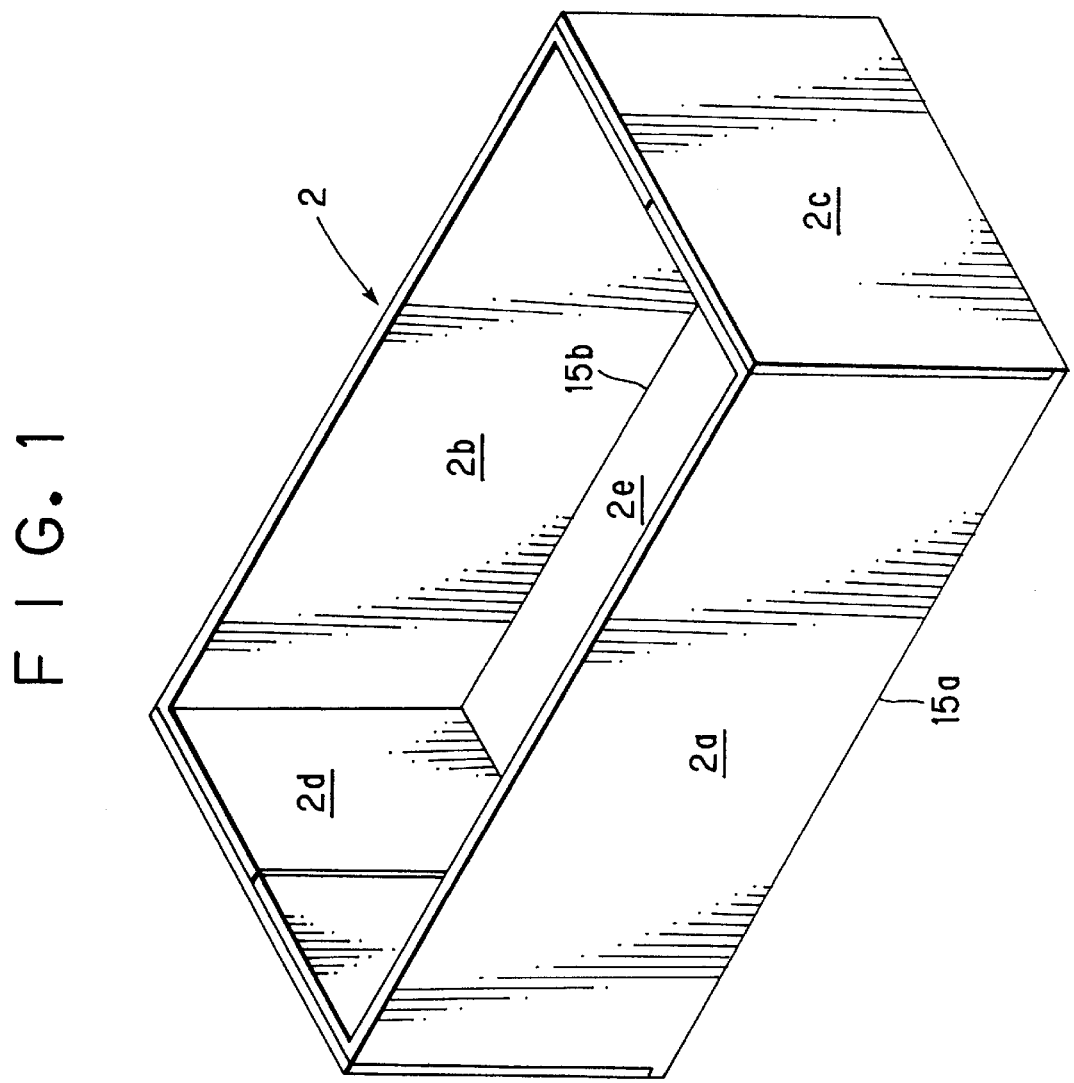
FIG. 1 is a perspective illustrating a rectangular parallelepipedic case.

In FIG. 1, a rectangular parallelepipedic case or quadrangular prismatic case 2 is illustrated. The case 2 has a top being open, and includes five faces, which are longer lateral faces 2a and 2b, shorter lateral faces 2c and 2d, and a bottom face 2e.

Figure 2:
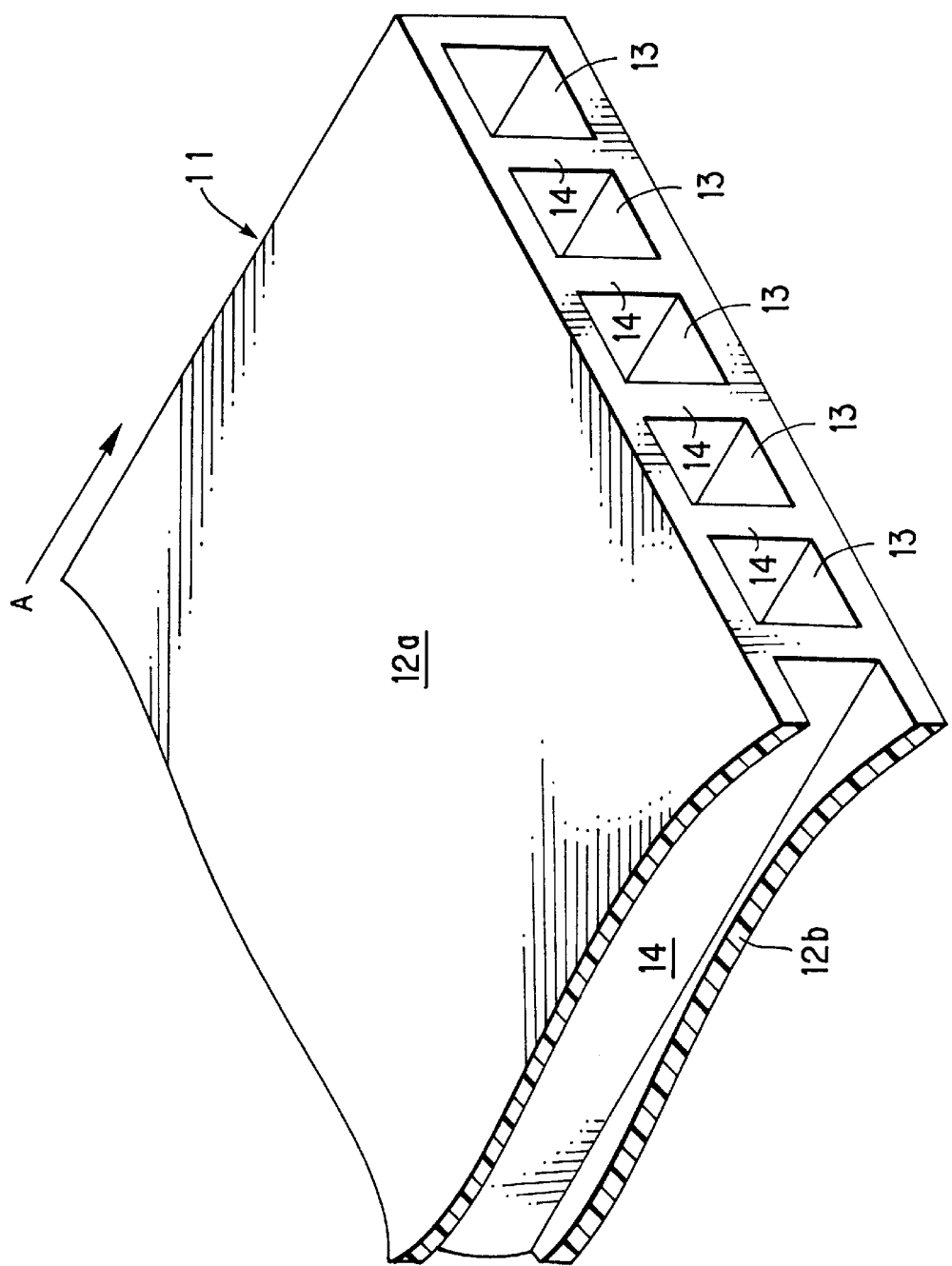
FIG. 2 is an explanatory view in perspective, illustrating a hollow plastic plate for producing the case.

The case 2 is formed from a hollow plastic plate 11 or double plate illustrated in FIG. 2. The hollow plastic plate 11 is formed by the extrusion method from polypropylene resin. The hollow plastic plate 11 consists of two plate elements 12a and 12b and a great number of partition portions 14. In FIG. 2, the partition portions 14 are extended in the unique direction A of the extrusion. Inside the hollow plastic plate 11, a great number of long and thin hollow chambers 13 are defined between adjacent two partition portions 14.

When the case 2 is built up, the plate element 12a is located inside, and the plate element 12b is located outside.

Figure 3:
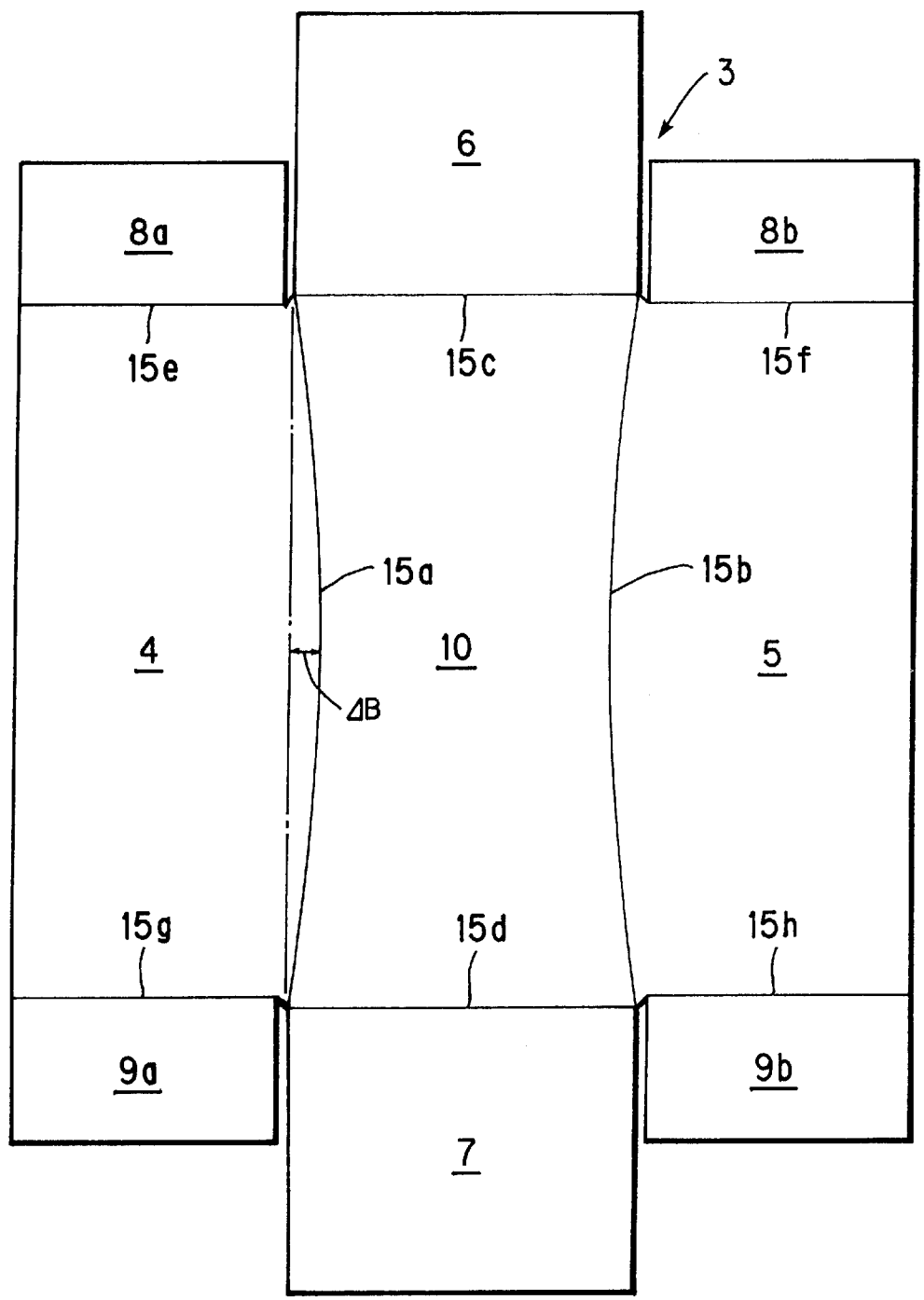
FIG. 3 is a plan illustrating a spread plate for producing the case.

In FIG. 3 as a development, the case 2 consists of longer lateral walls 4 and 5 or peripheral walls, shorter lateral walls 6 and 7 or end walls, and a bottom wall 10. The case 2 also includes securing portions 8a, 8b, 9a and 9b. The longer lateral walls 4 and 5 respectively become the longer faces 2a and 2b. The shorter lateral wall 6 is attached to the securing portions 8a and 8b. The shorter lateral wall 7 is attached to the securing portions 9a and 9b. The shorter lateral walls 6 and 7 respectively become the shorter faces 2c and 2d. Also the bottom wall 10 becomes the bottom face 2e.

Bend lines 15a–15h are defined between the portions of a spread plate 3 in development, or double plate. The spread plate 3 is bent along the bend lines 15a–15h. The securing portions 8a and 8b are attached to the shorter lateral wall 6, and the securing portions 9a and 9b are attached to the shorter lateral wall 7, to form the shape of the case 2.

Among the bend lines 15a–15h, the bend line 15a between the longer lateral wall 4 and the bottom wall 10 and the bend line 15b between the longer lateral wall 5 and the bottom wall 10 are curved convexly towards a center of the bottom wall 10. A radius of the curvature of the bend lines 15a and 15b is in a range of 1,000–12,000 millimeters. In FIG. 3, a maximum offset value ΔB is in a range of 1–10 millimeters.

Figure 4A:
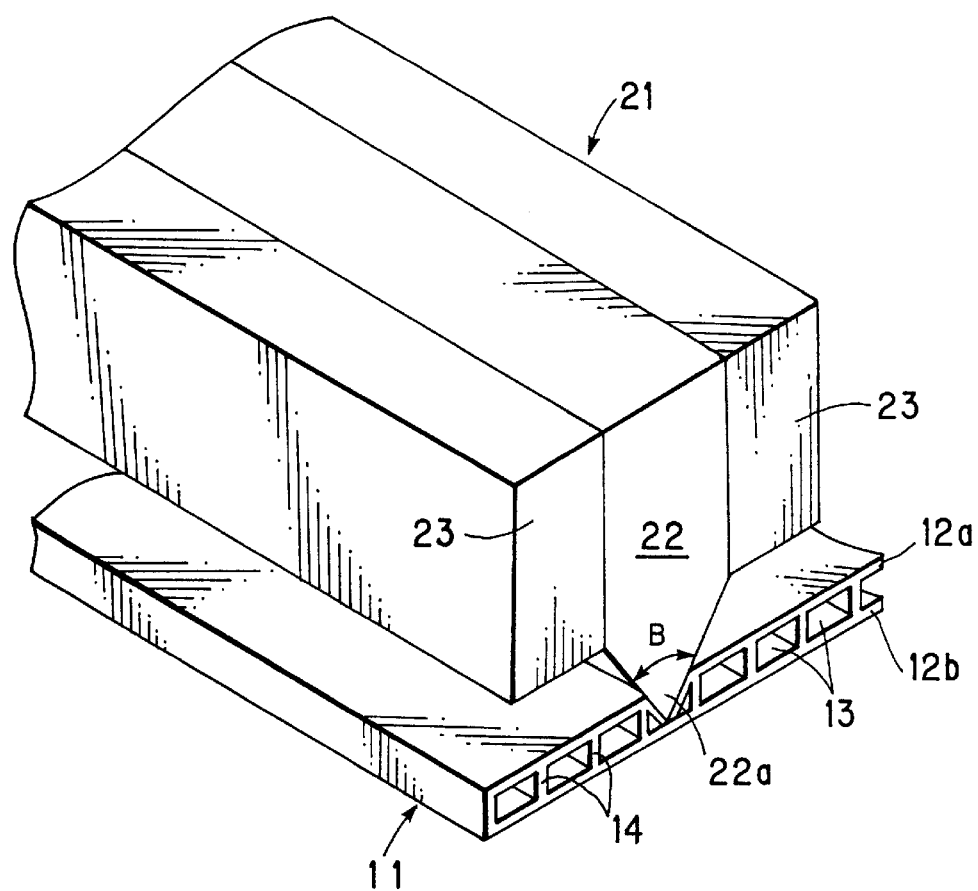
FIG. 4A is a perspective, partially broken, illustrating a heat presser with a hollow plastic plate.
Figure 4B:
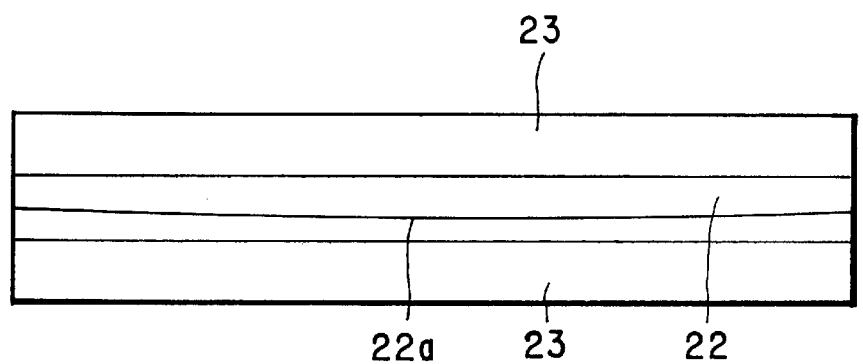
FIG. 4B is a bottom plan illustrating the heat presser.

In FIGS. 4A and 4B, a heat presser 21 for thermally pressing a ruled line is illustrated. The heat presser 21 is operated to form the bend lines 15a and 15b. The heat presser 21 consists of a pressing ridge 22 or pressing mold and a heater 23. The pressing ridge 22 has an edge 22a curved with a radius of curvature of the bend lines 15a and 15b. The heater 23 heats the pressing ridge 22. FIG. 4B is a plan in which a longitudinal shape of the edge 22a of the heat presser 21 is viewed.

To form the bend lines 15a and 15b with the heat presser 21, the heater 23 is energized first. The pressing ridge 22 is heated up to a temperature high enough to melt the resin of the spread plate 3. A tapered edge of the pressing ridge 22 is pressed against a portion in a position between the bottom wall 10 and each of the longer lateral walls 4 and 5. In FIG. 4A, the pressing ridge 22 causes the plate element 12a of the hollow plastic plate 11 to recess in a direction toward the plate element 12b, so that the bend lines 15a and 15b are formed and rendered flexible with great ease. Note that, in the present embodiment, the bend lines 15c–15h are straight. To form the bend lines 15c–15h, heat pressers of which an edge is straight are used.

The operation of the present embodiment is described now. At first the spread plate 3 of the hollow plastic plate 11 is bent along the bend lines 15a–15h. The securing portions 8a and 8b are attached to the shorter lateral wall 6, and the securing portions 9a and 9b are attached to the shorter lateral wall 7, to form the shape of the case 2.

Since the case 2 has the bend lines 15a and 15b that are curved, the longer lateral walls 4 and 5 having the longer faces 2a and 2b are curved concavely to a small extent. There is no convex curvature or no unwanted expansion of the longer lateral walls 4 and 5. It is unnecessary to use any reinforcing frame or auxiliary plate for avoiding expansion of the longer lateral walls 4 and 5. The case 2 can be produced at a low cost and in a simplified process, since no reinforcing frame or auxiliary plate is used.

In FIG. 5, another preferred embodiment is illustrated. A rectangular parallelepipedic case or quadrangular prismatic case 41 consists of a quadrangular tubular plate 42 and caps 43a and 43b or end walls. The tubular plate 42 has two ends which are both open and closed by the caps 43a and 43b. A top wall 42a of the case 41 is openable, and closed in a closed position. A fastener 46 retains the top wall 42a in the closed position.

Figure 6:
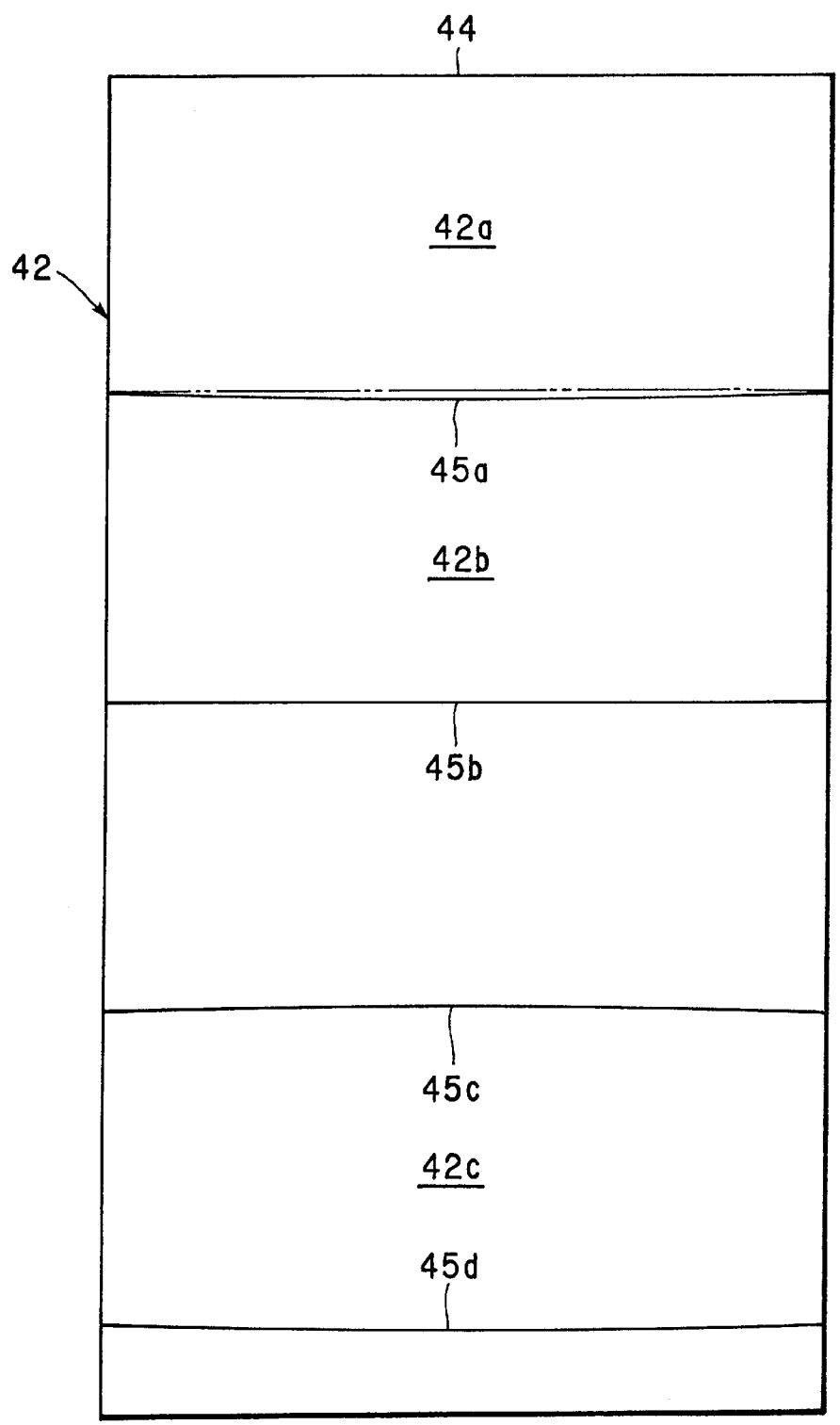
FIG. 6 is a plan in development, illustrating a spread plate for producing the case.

The tubular plate 42 is formed of a hollow plastic plate of polypropylene having a great number of long and thin hollow chambers. In FIG. 6, a spread plate 44 or double plate is bent along bend lines 45a–45d to produce the tubular plate 42. Among the bend lines 45a–45d, the bend lines 45a, 45c and 45d are curved in an arc shape. The bend line 45b is straight.

The curvature of the bend lines 45a, 45c and 45d causes lateral walls 42b and 42c to curve concavely, to prevent the lateral walls 42b and 42c from being deformed convexly in an unwanted manner. The case 41 can be produced at a low cost and in a simplified process, without need of any reinforcing frame or auxiliary plate.

Note that the spread plate 3, the hollow plastic plate 11 and the spread plate 44 are formed from polypropylene in the above embodiments, but may be formed from any suitably selected resin. The curvature of the bend lines 15a, 15b and the bend lines 45a, 45c and 45d can be set at a radius as desired.

In the above embodiments, the bend lines 15a, 15b and the bend lines 45a, 45c and 45d are curved in the arc shape.

Alternatively each curved bend line can be corrugated with curvature, or can consist of a combination of a shorter curve with a straight line.

Figure 7:
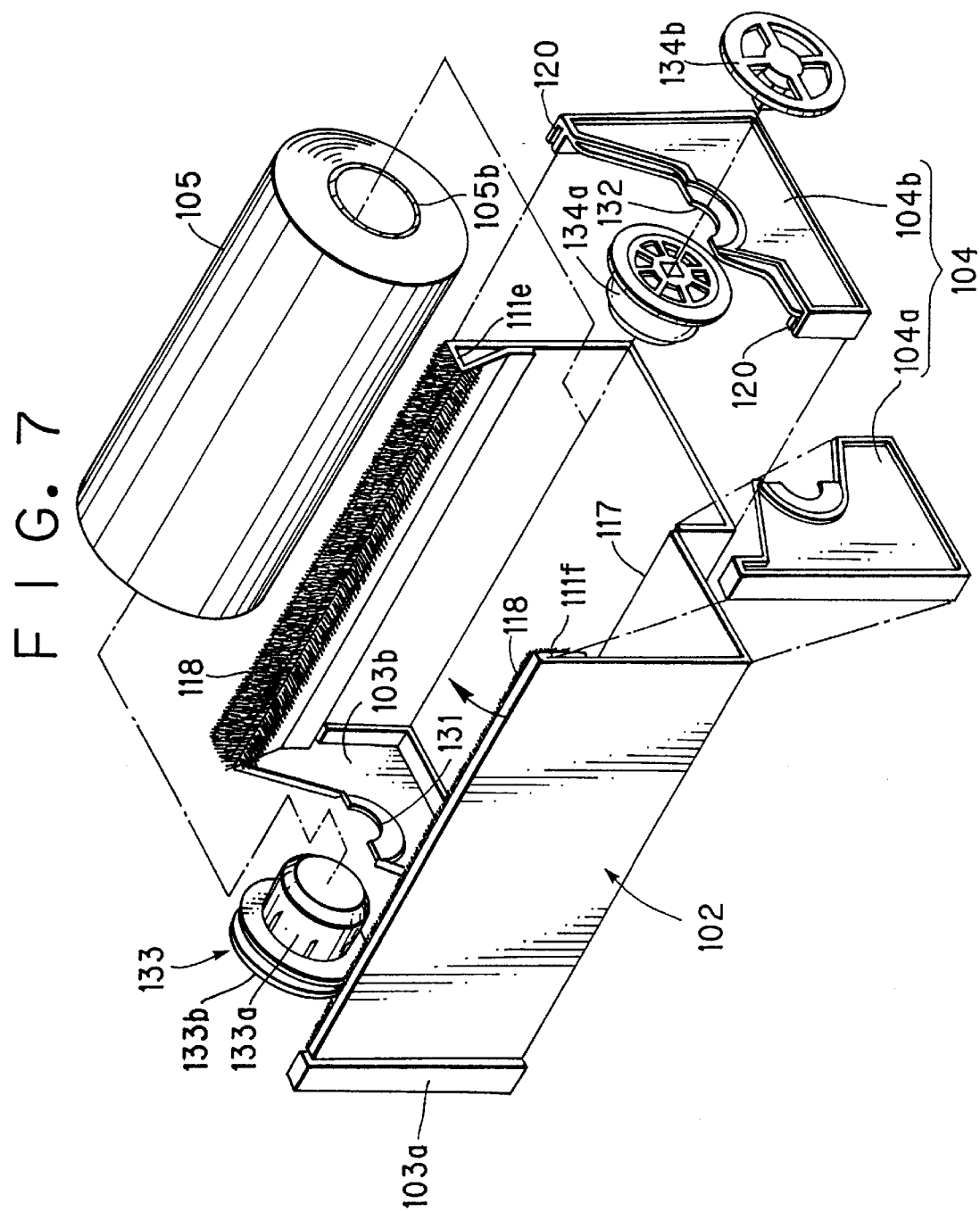
FIG. 7 is an exploded perspective illustrating a photographic paper magazine.
Figure 8:
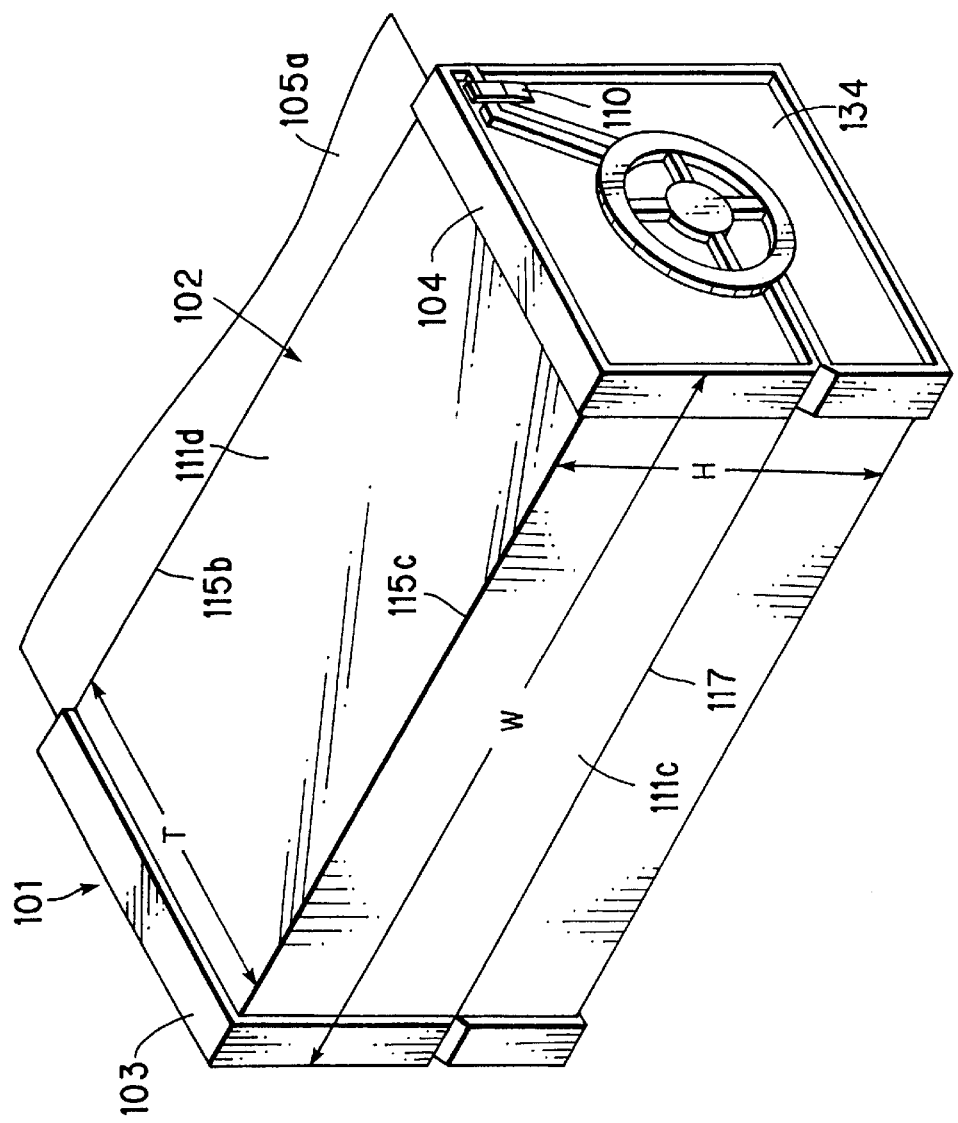
FIG. 8 is a perspective illustrating the magazine.

Referring to FIGS. 7 and 8, a photographic paper magazine 101 is described. The paper magazine 101 includes a quadrangular tubular plate 102 and caps 103 and 104 which close respective open ends of the quadrangular tubular plate 102. A paper roll 105 or roll of recording material is contained in the quadrangular tubular plate 102. The paper roll 105 consists of a roll of photographic paper 105a as recording material wound about a core 105b.

Figure 9:
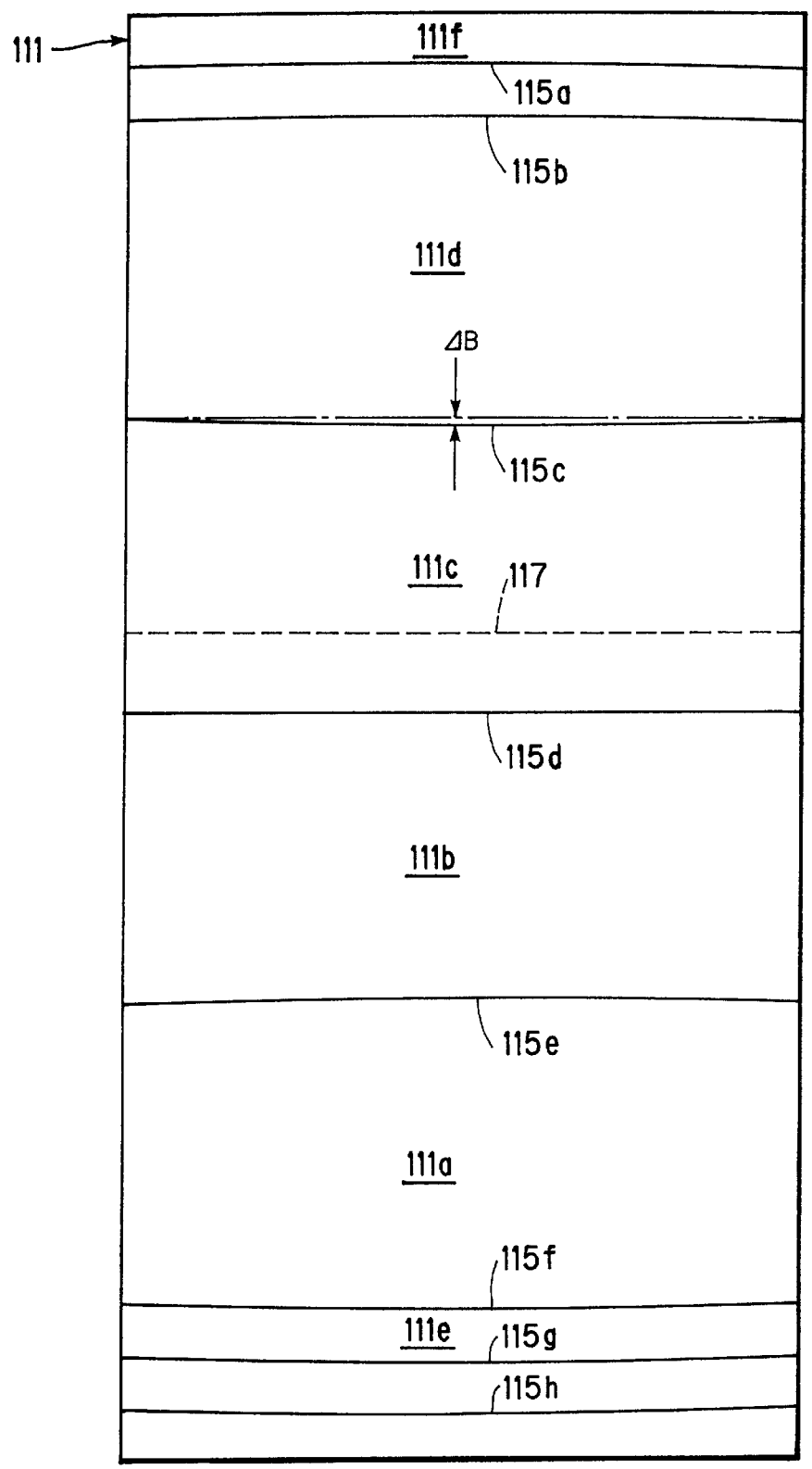
FIG. 9 is a plan illustrating a spread plate for producing the magazine.

In FIG. 9, a hollow plastic plate 111 or double plate is illustrated. The hollow plastic plate 111 for the quadrangular tubular plate 102 is formed by the extrusion method from polypropylene resin to which carbon with light-shielding opacity is mixed.

The hollow plastic plate 111 includes the hollow chambers 13, thus is very lightweight per unit area in comparison with a plastic plate without the hollow chambers 13. The partition portions 14 of the hollow plastic plate 111 render the hollow plastic plate 111 more rigid and durable than a plastic plate of equal weight only without the hollow chambers 13.

In FIG. 9, the quadrangular tubular plate 102 has a plurality of bend lines 115a–115h, which are formed on the hollow plastic plate 111 after being cut in a predetermined size. When the hollow plastic plate 111 is bent along the bend lines 115a–115h, there are formed four peripheral walls inclusive of a front lateral wall 111a, a bottom wall 111b, a rear lateral wall 111c, a top wall 111d, and an outlet 116, all included in the quadrangular tubular plate 102.

A radius of the curvature of the bend lines 115a–115c and 115e–115h is in a range of 1,000–12,000 millimeters. In FIG. 9, a maximum offset value ΔB is in a range of 1–10 millimeters. Note that the bend lines 115g and 115f, which bound outlet face 111e, may be straight without curvature.

The bend lines 115a–115c and 115e–115h curved in the arc shape are formed by the heat presser 21 in FIG. 4.

When the heat presser 21 forms each of the bend lines, it is required to regulate a thickness of the bend line in a sufficient thick range over a lower limit. To this end, a spacer is inserted in designated ones of the hollow chambers 13 before forming the bend line. The spacer preferably has a thickness of 0.1–1 mm, for example 0.5 mm. Note that, in the present embodiment, the bend line 115d is straight. To form the bend line 115d, a heat presser of which an edge is straight is used.

After using the heat presser 21 for forming the bend lines, it is likely that there occurs distortion in the hollow plastic plate 111 with partial protrusions. To solve such a problem, the hollow plastic plate 111 is subjected to the annealing process at a temperature of at lowest 100° C. for the purpose of eliminating the distortion. It is also possible to deform the hollow plastic plate 111 forcibly with distortion so as to stabilize the state of the hollow plastic plate 111.

Figure 10:
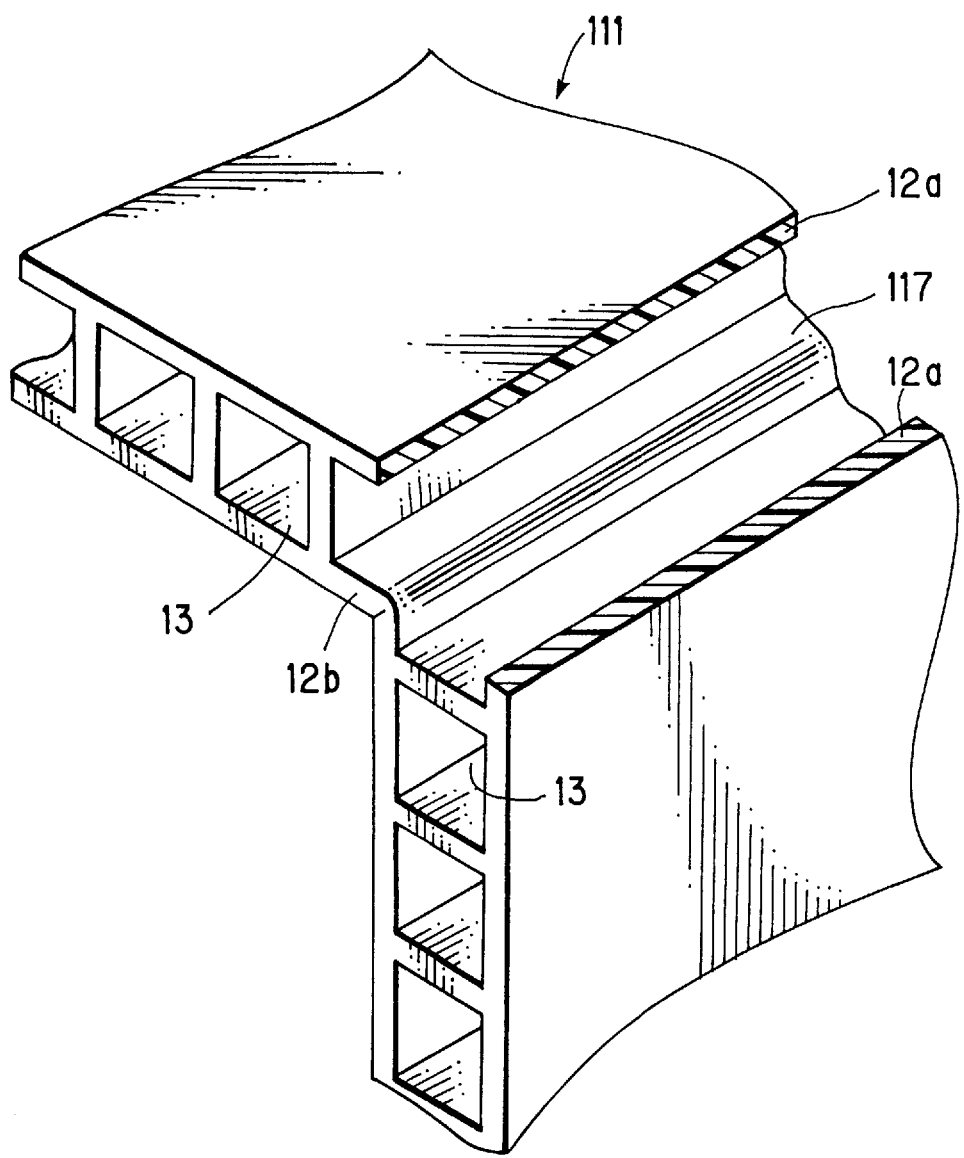
FIG. 10 is an explanatory view in perspective, illustrating a hinge line of the magazine.

A hinge line 117 or cut line is formed in the rear lateral wall 111c of the quadrangular tubular plate 102 to render the quadrangular tubular plate 102 openable. In FIG. 10, the plate element 12a, as one of the plate elements 12a and 12b, is cut along one of the hollow chambers 13 in the hollow plastic plate 111 to leave the hinge line 117 of the plate element 12b. The hinge line 117 renders the top wall 111d and a portion of the rear lateral wall 111c swingable from the bottom wall 111b and the front lateral wall 111b of the quadrangular tubular plate 102. Thus the top of the quadrangular tubular plate 102 is openable to load and unload the paper roll 105.

Two pieces of plush or light-trapping fabric 118 are attached respectively to the outlet face 111e and an outlet face 111f, both of which constitute the outlet 116 in the quadrangular tubular plate 102. The light-trapping fabric pieces 118 are known in the art of photographic material magazine, and consists of a plastic base sheet and a great number of plastic pile threads. The light-trapping fabric 118 prevents ambient light from entry into the paper magazine 101 through the outlet 116.

The cap 103 is constituted of an upper cap half 103a and a lower cap half 103b combined together in such a manner that the hinge line 117 and the outlet 116 are located between them. Similarly the cap 104 includes an upper cap half 104a and a lower cap half 104b. The upper cap halves 103a and 104a are engaged with the top wall 111d and the portion of the rear lateral wall 111c higher than the hinge line 117. The lower cap halves 103b and 104b are engaged with the bottom wall 111b, the front lateral wall 111a, and the portion of the rear lateral wall 111c lower than the hinge line 117. The upper and lower cap halves 103a, 103b, 104a and 104b are provided with engaging ridges 120, which edge portions of the quadrangular tubular plate 102 are received between and engaged with. The quadrangular tubular plate 102 is attached to the engaging ridges 120 by use of hot-melt adhesive agent.

At respective centers of the caps 103 and 104, bearing holes 131 and 132 are formed to support core supports 133 and 134. The core support 133 consists of a combination of an end shaft 133a and an end plate 133b. The end shaft 133a is inserted in the core 105b to support the paper roll 105. The end plate 133b keeps the end shaft 133a rotatable in the bearing hole 131. Similarly the core support 134 consists of a combination of an end shaft 134a and an end plate 134b. The core supports 133 and 134 keep the paper roll 105 rotatable in the paper magazine 101. Note that the end shaft 133a and the end plate 133b are formed in respective separate lines, and welded together by ultrasonic welding to obtain the core support 133.

Figure 11:
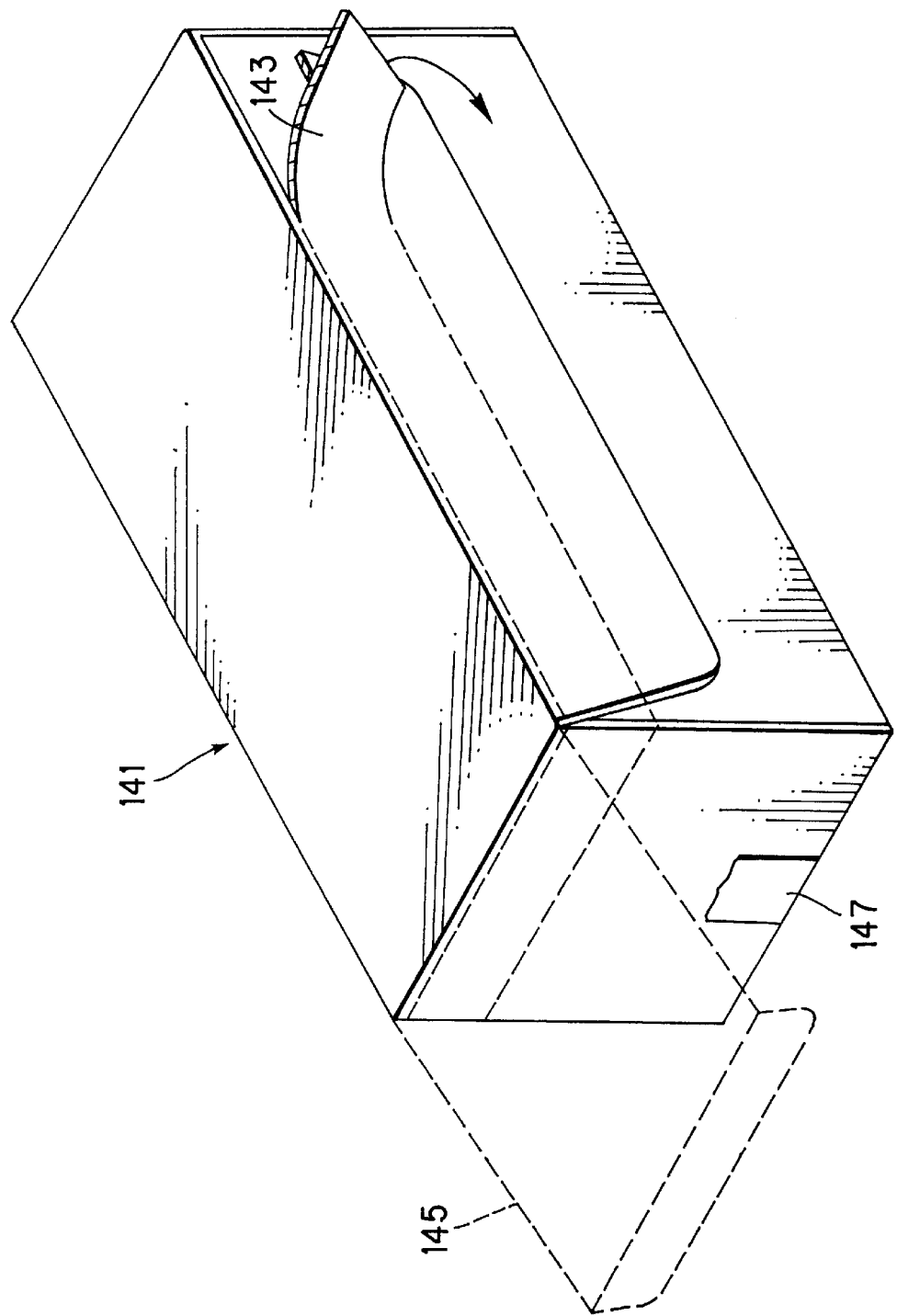
FIG. 11 is a perspective illustrating a cardboard box for supplying a paper roll.

In FIGS. 11 and 12, a corrugated cardboard box 141 is illustrated. The corrugated cardboard box 141 is used for supplying the paper roll 105 to be contained in the paper magazine 101. There are stopper plates 142a and 142b contained in the corrugated cardboard box 141, engaged with the core 105b for keeping the paper roll 105 from moving in the corrugated cardboard box 141. An openable lateral wall 145 is disposed, and opened before insertion of the paper roll 105. After the insertion, the openable lateral wall 145 is enclosed by use of a tape 147. To use the corrugated cardboard box 141, a peelable portion 143 is pulled with zip away from and eliminated from the corrugated cardboard box 141. The paper roll 105 is removed through the opened top and set into the paper magazine 101.

The operation of the paper magazine is described now. After the hollow plastic plate 111 is obtained by a cutting operation in the predetermined size, the bend lines 115a–115h are formed at first. While the heater 23 of the heat presser 21 is energized, the pressing ridge 22 is heated to a sufficiently high temperature. Then the pressing edge 22a is pressed against a predetermined position to form the curved bend lines 115a–115c and 115e–115h. Also the straight bend line 115d is formed by a straight heat presser. Before applying heat, the spacer is previously inserted in designated ones of the hollow chambers 13, for the purpose of regulating a recessing amount of the plural bend lines.

The heat presser 21 of sufficient temperature is pressed against portions in predetermined positions, so that it is possible to form the bend lines 115a–115h with ease. Then the hollow plastic plate 111 is subjected to the annealing process for the purpose of eliminating distortion created in the course of forming the bend lines 115a–115h. The annealing process continues, for example, for 10 minutes and at 110° C.

After the annealing process, the hinge line 117 is formed in the rear lateral wall 111c of the hollow plastic plate 111. The hinge line 117 is easily formed by cutting only one of the plate elements 12a and 12b of the hollow plastic plate 111. There is no need of using an extra hinge. One hinge line 117 is enough to render the quadrangular tubular plate 102 openable.

After producing the bend lines and the hinge line, the hollow plastic plate 111 is bent along the bend lines 115a–115h. Pieces of the light-trapping fabric 118 are respectively attached to the outlet faces 111e and 111f to complete the quadrangular tubular plate 102.

The caps 103 and 104 are attached to the quadrangular tubular plate 102. Respective edges of both open ends of the quadrangular tubular plate 102 are engaged with the engaging ridges 120 of the upper and lower cap halves 103a, 103b, 104a and 104b on both sides of the hinge line 117 and the outlet 116, and attached thereto by use of hot-melt adhesive agent.

The hollow plastic plate 111 includes the hollow chambers 13, and thus is very lightweight per unit area in comparison with a plastic plate that does not have the hollow chambers 13. The partition portions 14 of the hollow plastic plate 111 render the hollow plastic plate 111 very rigid and durable. Consequently the paper magazine 101 has both ease in production comparable with a corrugated cardboard magazine, and durability comparable with a conventional plastic magazine.

Insertion of the paper roll 105 into the paper magazine 101 is now described. At first, the peelable portion 143 is pulled away from the corrugated cardboard box 141 in FIGS. 11 and 12 to remove the paper roll 105. The top wall 111d and a portion of the rear lateral wall 111c of the quadrangular tubular plate 102 are rotated about the hinge line 117 of the paper magazine 101 together with the upper cap halves 103a and 104a, so that the quadrangular tubular plate 102 is opened. The end shafts 133a and 134a of the core supports 133 and 134 are inserted into respective ends of the core 105b of the paper roll 105. The paper roll 105 is set into the paper magazine 101 in a manner of engaging the core supports 133 and 134 with the bearing holes 131 and 132 of the caps 103 and 104. Thus the paper roll 105 is supported in the paper magazine 101 in a rotatable manner.

Then the upper cap halves 103a and 104a are swung to close the quadrangular tubular plate 102. To lock the upper cap halves 103a and 104a with the lower cap halves 103b and 104b, a clip 110 of FIG. 8 is used. The clip 110 may be of metal, resin or any other material. A preferred example of the clip 110 in view of stable fixation is a metallic clip "MINIATURE CATCH" (trade name) produced by Takigen Co.

A small leader portion of the photographic paper 105a is unwound from the paper roll 105, and kept protruded from the outlet 116 of the paper magazine 101. Thus the paper magazine 101 is repeatedly loadable with the paper roll 105. When the paper magazine 101 is set into an optical instrument such as a photographic printer, the photographic paper 105a can be supplied smoothly.

EXAMPLE

In FIG. 8, an example of the paper magazine 101 has a length W which is in a range of 100–700 mm, and preferably 640 mm. Each of a width T and a height H is in a range of 100–300 mm, and preferably 168 mm.

An inner diameter of the core 105b of the paper roll 105 contained in the paper magazine 101 is for example 70 mm. Shaft portions of the end shafts 133a and 134a insertable into the core 105b are also 70 mm across.

In FIG. 9, the maximum offset value $\Delta B$ of the bend lines is in a range of 0.5–5 mm, preferably 0.5–3.5 mm, and desirably 0.5–2.5 mm. The maximum offset value $\Delta B$ is determined also in consideration of the length W as indicated in the table below.

| W (mm) | $\Delta B$ (mm) | $\Delta B/W$ |
|---|---|---|
| 100–300 | 1.0 | 0.003–0.01 |
| 301–457 | 1.5 | 0.003–0.005 |
| 458–700 | 2.0 | 0.003–0.005 |

In FIG. 4, the edge angle B of the pressing edge 22a of the heat presser 21 is in a range of 70°–150°, and preferably 85°–135°, and desirably 90°–110°. The temperature of the pressing ridge 22 of the heat presser 21 can be determined at any value for softening or melting the hollow plastic plate 111. If the edge angle B is in the range of 90°–135°, then the temperature is set in a range of 180°–300° C., and preferably 240°–280° C.

The annealing process after using the heat presser 21, is carried out for 10 minutes or longer at 100° C. or hotter, for example 10 minutes at 110° C.

The hollow plastic plate 111 is formed from polypropylene resin, which may have density of 100–2,000 g/m$^2$, preferably 500–1,500 g/m$^2$, and desirably 800–1,300 g/m$^2$. Examples of the polypropylene are MITSUBISHI POLYPRO BC8 (trade name) manufactured by Mitsubishi Chemical Industries Ltd., and MITSUBISHI POLYPRO ECX (trade name) manufactured by Mitsubishi Chemical Industries Ltd.

To render the quadrangular tubular plate 102 opaque, the carbon is mixed with the resin for the hollow plastic plate 111. Examples of the carbon are MITSUBISHI CARBON #41 (trade name) manufactured by Mitsubishi Chemical Industries Ltd., and MITSUBISHI CARBON #44 (trade name) manufactured by Mitsubishi Chemical Industries Ltd. A ratio of mixing the carbon with the resin is in a range of 0.5–10%, and preferably is 7.5%.

The hinge line 117 in the rear lateral wall 111c of the quadrangular tubular plate 102 is flexible as only one of the plate elements 12a and 12b remains intact. The hinge line 117 has such durability that the hinge line 117 is not broken even after the quadrangular tubular plate 102 is experimentally bent for 100,000 times along the hinge line 117.

The caps 103 and 104 are attached to the quadrangular tubular plate 102 by means of hot-melt adhesive agent, examples of which are NITTAIT HT-1729 (trade name) manufactured by Nitta Gelatin Co., and NITTAIT HT-766 (trade name) manufactured by Nitta Gelatin Co. The specific features of the hot-melt adhesive agent are as follows.

Main component: ethylene/vinyl acetate copolymer resin;

Softening point: 83°±10° C.;

Optimum temperature in use: 180°±10° C.;

Melting Point (Softening point): 160°–180° C. with viscosity of 1,500–2,500 mPa·s (CPS);

Open time: 4 seconds at 23° C.;

Set time: 1 seconds at 23° C.

The paper magazine 101 contains the photographic paper. In general, examples of the recording material to be contained in the paper magazine 101 are photographic film, photographic paper, non silver photosensitive recording material, thermosensitive recording material, photosensitive thermosensitive recording material, and image recording paper for recording material.

Examples of the base material of the photographic paper or recording material are polyester film, polyacetate film, synthesized paper, paper-type film, and the like. The base material is for example 25–300 $\mu$m thick, 10–100 meters long, and 3.5–70 centimeters wide.

In the above embodiment, the case and the magazine have the shape of a rectangular parallelepiped of which the end faces are square, and the sides are longer in the axial direction of the roll than in the radial direction. Alternatively a case or magazine of the present invention may be formed in the shape of a cube, an irregular quadrangular prism, a triangular, pentagonal or polygonal prism, or a polyhedron with substantially six faces. A case or magazine may be formed in a box shape shorter in the axial direction of the roll than in the radial direction.

In the above embodiment, the case and the magazine preferably satisfy a condition:

$$0.003 \leq \Delta B/W \leq 0.01$$

where W is a distance between distal ends of the curved bend line, and $\Delta B$ is an offset value at which the curved bend line is deviated furthest from a straight line passing through the distal ends of the curved bend line. However a case or a magazine of the present invention may be constructed to satisfy $\Delta B/W < 0.003$ or $\Delta B/W > 0.01$.

Although the present invention has been fully described by way of the preferred embodiments thereof with reference to the accompanying drawings, various changes and modifications will be apparent to those having skill in this field. Therefore, unless changes and modifications depart from the scope of the present invention, they should be construed as included therein.

What is claimed is:

1. A case producing method of producing a substantially rectangular parallelepipedic case, said case having plural walls formed by bending a single plate, said case producing method comprising the steps of:

providing a double plate, said double plate being formed from plastic by extrusion, said double plate including first and second plate elements confronted with each other, and partition portions for interconnecting said first and second plate elements, said plural partition portions extending in an extruding direction, to define plural hollow chambers between said first and second plate elements; and bending said double plate along plural bend lines substantially at a right angle, at least one of said bend lines being at least partially curved, wherein said at least one curved bend line causes at least one of said walls to curve inward with respect to said case, and wherein said at least one curved bend line is located between two adjacent ones of said partition portions.

2. A case producing method as defined in claim 1, wherein said extruding direction of said double plate is a longitudinal direction along the length of said case.

3. A case producing method as defined in claim 2, wherein said case has a box shape of which a top is open, and said walls include a bottom wall and first to fourth lateral walls erected from said bottom wall, said first and second lateral walls are arranged in said extruding direction and located opposite to one another with respect to said bottom wall as viewed with said plate where said case is spread, and said third and fourth lateral walls are arranged in a direction crosswise to said extruding direction and located opposite to one another with respect to said bottom wall as viewed with said plate where said case is spread.

4. A case producing method as defined in claim 3, wherein said bend lines include first to fourth bend lines, said first bend line is located between said bottom wall and said first lateral wall, said second bend line is located between said bottom wall and said second lateral wall, said third bend line is located between said bottom wall and said third lateral wall, said fourth bend line is located between said bottom wall and said fourth lateral wall, and said third and fourth bend lines are curved convexly toward each other.

5. A case producing method as defined in claim 4, wherein said double plate further includes:

first and second securing portions, disposed on said third lateral wall, located opposite to one another with respect thereto, and arranged in said extruding direction;

third and fourth securing portions, disposed on said fourth lateral wall, located opposite to one another with respect thereto, and arranged in said extruding direction;

a fifth bend line located between said third lateral wall and said first securing portion;

a sixth bend line located between said third lateral wall and said second securing portion;

a seventh bend line located between said fourth lateral wall and said third securing portion;

an eighth bend line located between said fourth lateral wall and said fourth securing portion;

wherein said first and third securing portions are secured to an inside of said first lateral wall, and said second and fourth securing portions are secured to an inside of said second lateral wall.

6. A case producing method as defined in claim 2, wherein said case has a shape of a quadrangular tube of which two ends are open, and said walls include first to fourth walls arranged in a direction crosswise to said extruding direction.

7. A case producing method as defined in claim 6, wherein said case further includes two caps respectively secured to said open ends.

8. A case producing method as defined in claim 1, wherein said bend lines are formed by a heat presser, said heat presser has a triangularly tapered shape tapered at an angle from 70° to 150°.

9. A case producing method as defined in claim 8, wherein said plastic is polypropylene.

10. A substantially rectangular parallelepipedic case, having plural walls, said case comprising:

a double plate formed from plastic by extrusion, said double plate including first and second plate elements confronted with each other, and partition portions for interconnecting said first and second plate elements, said plural partition portions extending in an extruding direction, to define plural hollow chambers between said first and second plate elements; and plural bend lines formed on said first plate element such that said second plate element remains free from bend lines, said double plate being bent along said plural bend lines substantially at a right angle to define said walls, at least one of said bend lines being at least partially curved; and a hinge line, parallel to one of said bend lines, for folding one of said walls into two, said hinge line being formed by cutting an inner one of said first and second plate elements in a substantially straight manner.

11. A substantially rectangular parallelepipedic case as defined in claim 10, wherein said bend lines are formed by a heat presser, said heat presser has a triangularly tapered shape tapered at an angle from 70° to 150°.

12. A substantially rectangular parallelepipedic case as defined in claim 10, wherein said at least one curved bend line causes at least one of said walls to curve inwards with respect to said case.

13. A substantially rectangular parallelepipedic case as defined in claim 10, said case containing a recording material roll, said recording material roll including a core and recording material wound about said core;

first to third ones of said bend lines being formed by a heat presser;

a first one of said walls being confronted with a third one of said walls, and a second one of said walls being confronted with a fourth one of said walls to define a shape of a quadrangular tube of which two ends are open, said first bend line being located between said first and second walls, said second bend line being located between said second and third walls, said third bend line being located between said third and fourth walls;

further comprising:

a slit-shaped outlet, defined between said first and fourth walls, said recording material being drawn through said slit-shaped outlet;

first and second caps, secured to respective ends of said quadrangular tubular shape, for supporting said recording material roll in a rotatable manner.

14. A substantially rectangular parallelepipedic case, having plural walls, said case comprising:

a double plate formed from plastic by extrusion, said double plate including first and second plate elements confronted with each other, and partition portions for interconnecting said first and second Plate elements, said plural partition portions extending in an extruding direction, to define plural hollow chambers between said first and second plate elements; and plural bend lines formed on said double plate, said double plate being bent along said plural bend lines substantially at a right angle to define said walls, at least one of said bend lines being at least partially curved, wherein said at least one curved bend line causes at least one of said walls to curve inward with respect to said case, and said at least one curved bend line is located between two adjacent ones of said partition portions.

15. A substantially rectangular parallelepipedic case as defined in claim 14, wherein said case is long in a longitudinal direction, and said extruding direction of said double plate is said longitudinal direction.

16. A substantially rectangular parallelepipedic case as defined in claim 15, wherein said plastic is polypropylene.

17. A substantially rectangular parallelepipedic case as defined claim 14, further comprising:

a hinge line, parallel to one of said bend lines, for folding one of said walls into two, said hinge line being formed by cutting an inner one of said first and second plate elements in a substantially straight manner.

18. A substantially rectangular parallelepipedic case, having plural walls, said case comprising:

a double plate formed from plastic by extrusion, said double plate including first and second plate elements confronted with each other, and partition portions for interconnecting said first and second plate elements, said plural partition portions extending in an extruding direction, to define plural hollow chambers between said first and second plate elements; and plural bend lines formed on said double plate, said double plate being bent along said plural bend lines substantially at a right angle to define said walls, at least one of said bend lines being at least partially curved;

said case containing a recording material roll, said recording material roll including a core and recording material wound about said core;

first to third ones of said bend lines being formed by a heat presser;

a first one of said walls being confronted with a third one of said walls, and a second one of said walls being confronted with a fourth one of said walls to define a shape of a quadrangular tube of which two ends are open, said first bend line being located between said first and second walls, said second bend line being located between said second and third walls, said third bend line being located between said third and fourth walls;

a slit-shaped outlet, defined between said first and fourth walls, said recording material being drawn through said slit-shaped outlet;

first and second caps, secured to respective ends of said quadrangular tubular shape, for supporting said recording material roll in a rotatable manner; and further comprising a hinge line, parallel with said first bend line, for folding said second wall into two, said hinge line being formed by cutting an inner one of said first and second plate elements in a substantially straight manner.

19. A substantially rectangular parallelepipedic case as defined in claim 18, wherein said first and second caps include respective holes formed therein for supporting core holders, and said core holders are coupled with respective ends of said core.

20. A substantially rectangular parallelepipedic case as defined in claim 19, wherein said case is long in a longitudinal direction, and said extruding direction of said double plate is said longitudinal direction.

21. A substantially rectangular parallelepipedic case as defined in claim 20, wherein said each of said first and second caps includes first and second cap halves defined by a separation line lying across said hole, said first cap half is secured to an edge of said first wall, and a partial edge of said second wall between said first bend line and said hinge line, and said second cap half is secured to a partial edge of said second wall between said second bend line and said hinge line, an edge of said third wall, and an edge of said fourth wall.

22. A substantially rectangular parallelepipedic case as defined in claim 21, wherein said first and third bend lines are curved.

23. A substantially rectangular parallelepipedic case as defined in claim 22, wherein said first and third bend lines are respectively located between two adjacent ones of said partition portions.

* * * * *